(12) United States Patent
Mitsuhashi

(10) Patent No.: US 11,574,211 B2
(45) Date of Patent: Feb. 7, 2023

(54) LOG ANALYSIS SYSTEM, LOG ANALYSIS METHOD, LOG ANALYSIS PROGRAM, AND STORAGE MEDIUM

(71) Applicant: NEC Corporation, Tokyo (JP)

(72) Inventor: Hideo Mitsuhashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 381 days.

(21) Appl. No.: 16/642,091

(22) PCT Filed: Sep. 27, 2017

(86) PCT No.: PCT/JP2017/034930
§ 371 (c)(1),
(2) Date: Feb. 26, 2020

(87) PCT Pub. No.: WO2019/064370
PCT Pub. Date: Apr. 4, 2019

(65) Prior Publication Data
US 2020/0210865 A1    Jul. 2, 2020

(51) Int. Cl.
| G06F 11/00 | (2006.01) |
| G06N 5/04 | (2006.01) |
| G06N 20/00 | (2019.01) |
| G06F 11/30 | (2006.01) |
| G06F 11/34 | (2006.01) |
| G06Q 20/20 | (2012.01) |

(52) U.S. Cl.
CPC ............ *G06N 5/04* (2013.01); *G06F 11/3013* (2013.01); *G06F 11/3476* (2013.01); *G06N 20/00* (2019.01); *G06Q 20/20* (2013.01)

(58) Field of Classification Search
CPC ............ G06F 11/3476; G06F 11/0757; G06F 11/076; G06F 11/07
See application file for complete search history.

(56) References Cited

U.S. PATENT DOCUMENTS

| 10,678,669 B2 * | 6/2020 | Debnath ............ G06F 11/3072 |
| 2012/0204150 A1 | 8/2012 | Mohan et al. |
| 2015/0277416 A1 | 10/2015 | Nikovski et al. |
| 2018/0165174 A1 | 6/2018 | Ajiro et al. |
| 2018/0219894 A1 * | 8/2018 | Crabtree ................. H04L 63/20 |

(Continued)

FOREIGN PATENT DOCUMENTS

| JP | 2003-331089 A | 11/2003 |
| JP | 2008-192091 A | 8/2008 |
| JP | 2011-065440 A | 3/2011 |

(Continued)

OTHER PUBLICATIONS

International Search Report of PCT/JP2017/034930 dated Nov. 21, 2017.

*Primary Examiner* — Amine Riad
(74) *Attorney, Agent, or Firm* — Sughrue Mion, PLLC

(57) ABSTRACT

Provided is a log analysis system including: an identifying unit that identifies transactions from logs output from a device; a grouping unit that categorizes the transactions having both the same log related to start and the same log related to end into the same group; a learning unit that creates a learning model that defines the number of occurrences on a log type basis in the transactions of the same group; and an inspection unit that inspects a transaction of an inspection target based on the learning model.

15 Claims, 10 Drawing Sheets

(56) References Cited

U.S. PATENT DOCUMENTS

2018/0307576 A1\* 10/2018 Debnath ............. G06F 11/3072
2022/0237095 A1\* 7/2022 Takai .................. G06F 11/3072

FOREIGN PATENT DOCUMENTS

| JP | 2012-094046 A | 5/2012 |
| JP | 2012-168945 A | 9/2012 |
| JP | 2013-041367 A | 2/2013 |
| JP | 2015-197917 A | 11/2015 |
| JP | 5913145 B2 | 4/2016 |
| WO | 2016/199433 A1 | 12/2016 |
| WO | 2017/094263 A1 | 6/2017 |

\* cited by examiner

FIG. 8

| No | Anomaly detection conditions |
|---|---|
| 1 | The number of occurrences of an inspection log exceeds the maximum number of occurrences in a learning model. |
| 2 | The number of occurrences of an inspection log is less than the minimum number of occurrences in a learning model. |
| 3 | The log classification ID is different between the end log of a transaction and the end log in a learning model. |
| 4 | The required time from the start to the end of a transaction of an inspection target is shorter than the shortest time defined in a learning model. |
| 5 | The required time from the start to the end of a transaction of an inspection target is longer than the longest time defined in a learning model. |
| 6 | A log classification ID not included in a learning model appears in a transaction of an inspection target. |
| 7 | None of log classification IDs included in a learning model appears in a transaction of an inspection target. |
| 8 | The ratio of the number of occurrences of a log classification ID is different between a transaction of an inspection target and a learning model. |
| ... | ... |

LOG ANALYSIS SYSTEM, LOG ANALYSIS METHOD, LOG ANALYSIS PROGRAM, AND STORAGE MEDIUM

CROSS REFERENCE TO RELATED APPLICATIONS

This application is a National Stage of International Application No. PCT/JP2017/034930 filed Sep. 27, 2017.

TECHNICAL FIELD

The present invention relates to a log analysis system, a log analysis method, a log analysis program, and a storage medium.

BACKGROUND ART

In recent years, electronic devices such as a Point Of Sales (POS) terminal have been introduced in retail shops such as a convenience store, a supermarket, or the like to increase work efficiency of store operation, such as accounting work, ordering work, inventory management work, or the like. However, suspension of an electronic device immediately causes suspension of store operation. Thus, when a failure occurs in an electronic device, it is necessary to detect the failure early and restore the electronic device.

For example, Patent Literature 1 discloses a method for performing machine learning on logs output from a normal state electronic device and detecting a failure based on the content of learning. In this method, what sequence the logs at learning appear in is learned in advance. A failure is then detected by determining whether or not the occurrence sequence of logs at inspection matches the occurrence sequence of logs at learning.

CITATION LIST

Patent Literature

PTL 1: Japanese Patent Application Laid-Open No. 2015-197917

SUMMARY OF INVENTION

Technical Problem

For example, in an electronic device such as a POS terminal operated by a person, an irregular operation such as an irregular interruption operation, exchange of the operation sequence, or the like may be performed. Thus, even when an electronic device is in a normal state, the occurrence sequence of logs is not always the same. To address this, in the conventional art disclosed in Patent Literature 1, an occurrence sequence of logs at a certain time is learned as a normal state. Thus, when a log of a different type from the content of learning, for example, a log including an irregular interruption operation or the like is inspected, an occurrence of a failure may be erroneously detected despite the fact that a device is operating in a normal state.

Accordingly, in view of the problem described above, the present invention intends to provide a log analysis system, a log analysis method, a log analysis program, and a storage medium that can accurately detect a failure from logs output from an electronic device.

Solution to Problem

According to one example aspect of the present invention, provided is a log analysis system including: an identifying unit that identifies transactions from logs output from a device; a grouping unit that categorizes the transactions having both the same log related to start and the same log related to end into the same group; a learning unit that creates a learning model that defines the number of occurrences on a log type basis in the transactions of the same group; and an inspection unit that inspects a transaction of an inspection target based on the learning model.

Advantageous Effects of Invention

According to the present invention, a log analysis system, a log analysis method, a log analysis program, and a storage medium that can accurately detect a failure from logs output from an electronic device can be provided.

BRIEF DESCRIPTION OF DRAWINGS

FIG. 8 is a diagram illustrating a specific example of anomaly detection conditions in the first example embodiment.

DESCRIPTION OF EMBODIMENTS

Example embodiments of the present invention will be described below with reference to the drawings. Note that, throughout the drawings illustrated below, elements having the same function or corresponding functions are labeled with the same references, and repeated description thereof may be omitted.

First Example Embodiment

Figure 1:
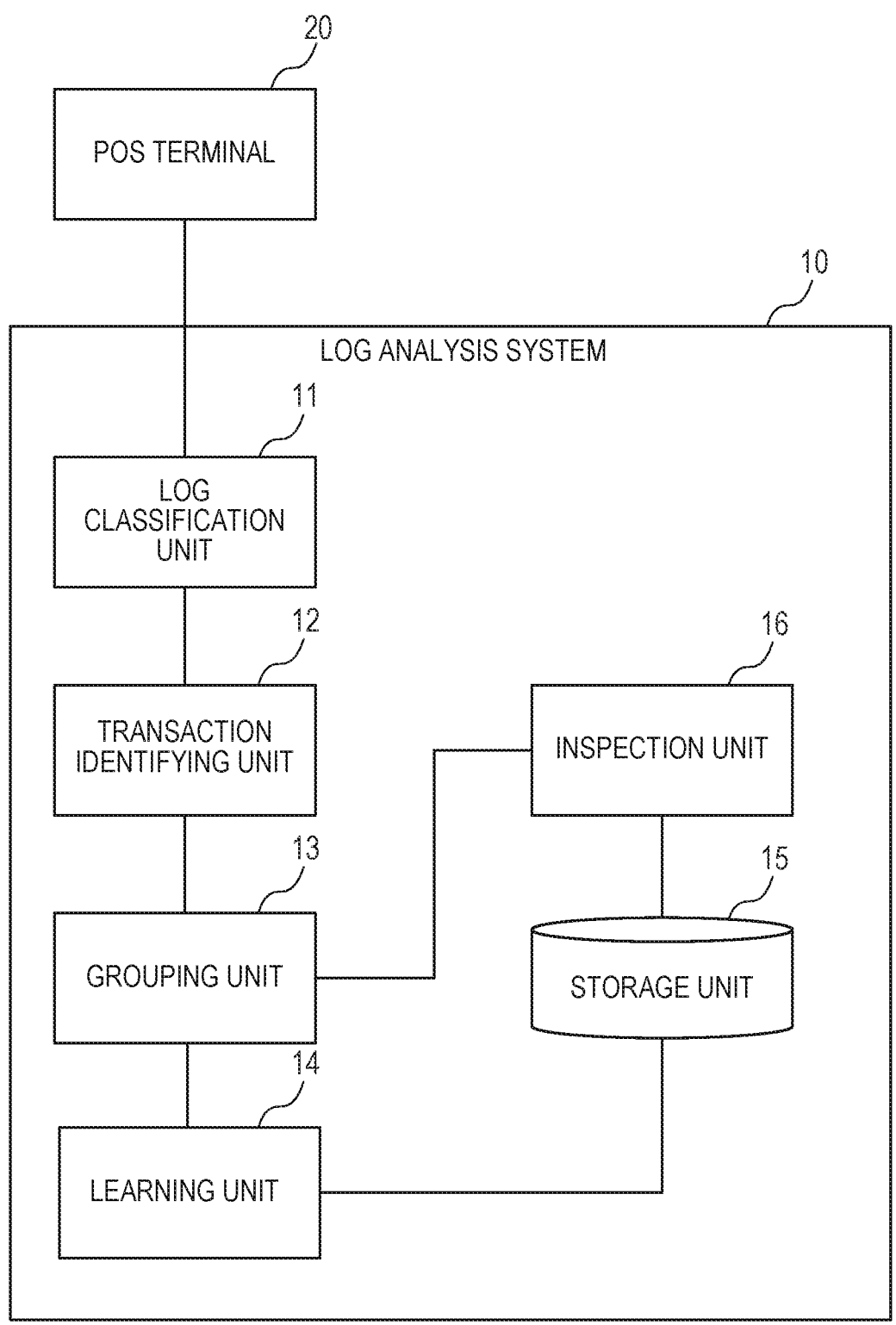
FIG. 1 is a block diagram illustrating a function of a log analysis system according to a first example embodiment.

FIG. 1 is a block diagram illustrating a function of a log analysis system 10 according to a first example embodiment. The log analysis system 10 has a log classification unit 11, a transaction identifying unit 12, a grouping unit 13, a learning unit 14, a storage unit 15, and an inspection unit 16.

The log classification unit 11 provides a log classification ID in accordance with the type of each log data to a log output from a POS terminal (electronic device) 20 at learning (at a normal state operation) (hereafter, referred to as "normal log") and a log output at inspection (hereafter, referred to as "inspection log"). In the present example embodiment, the log classification unit 11 provides a log classification ID having the same numerical value as a label to the same type of logs. However, a log classification ID may be one or more symbols and one or more characters as long as it can distinguish a classification without being limited to a numerical value.

The log classification unit 11 can perform a process by using a conventional technique of classifying logs in accordance with data type. For example, the log classification unit 11 uses a log classification method of classifying logs having high similarity into the same classification (see International Publication No. WO2016/199433), a log classification method of classifying logs in accordance with a preset template (see Japanese Patent No. 5913145), or the like.

The transaction identifying unit 12 identifies a transaction out of a data group of normal logs and inspection logs. Here, "transaction" refers to a data set of logs that can be extracted as a group, such as a series of predetermined operations. When illustration is provided with an example of the POS terminal 20, a series of logs corresponding to operations on a register for a purchased item for each customer correspond to a transaction. That is, a series of entry operations on a register for the first customer is a different transaction from a series of operations on a register for the second customer.

Further, the transaction identifying unit 12 provides a unique transaction ID to each transaction. While the transaction ID is provided in a form of "TID_+numerical value" in the present example embodiment, another form may be used as long as a transaction can be identified.

For example, when identification information indicating a transaction is provided in advance to a log output from the POS terminal 20, the transaction identifying unit 12 can identify the transaction based on the identification information.

On the other hand, when identification information indicating a transaction is not provided to a log, the transaction identifying unit 12 can identify a transaction by using a method of using a blank part of a certain interval in a log output period as the boundary of transactions, for example. For example, a log output period at the POS terminal 20 has a temporal blank between the first customer and the second customer in entry operations on a register. Thus, a transaction can be identified by such a method.

The grouping unit 13 categorizes, into the same group, transactions having both the same log classification IDs provided to normal logs related to the start of a transaction and the same log classification IDs provided to normal logs related to the end of a transaction.

The learning unit 14 creates a learning model that defines the number of occurrences of normal logs in the same group of transactions on a type basis. In the present example embodiment, the learning model defines the maximum number and the minimum number of the number of occurrences for each log classification ID in a table form among a plurality of transactions categorized into the same group. However, the form of a learning model is not limited to a table form.

The storage unit 15 stores a learning model created by the learning unit 14, a program corresponding to an anomaly detection condition used by the inspection unit 16 at an inspection process, or the like.

The inspection unit 16 inspects a transaction of an inspection log based on a learning model and a predetermined anomaly detection condition. An inspection method will be described later in detail.

Figure 2:
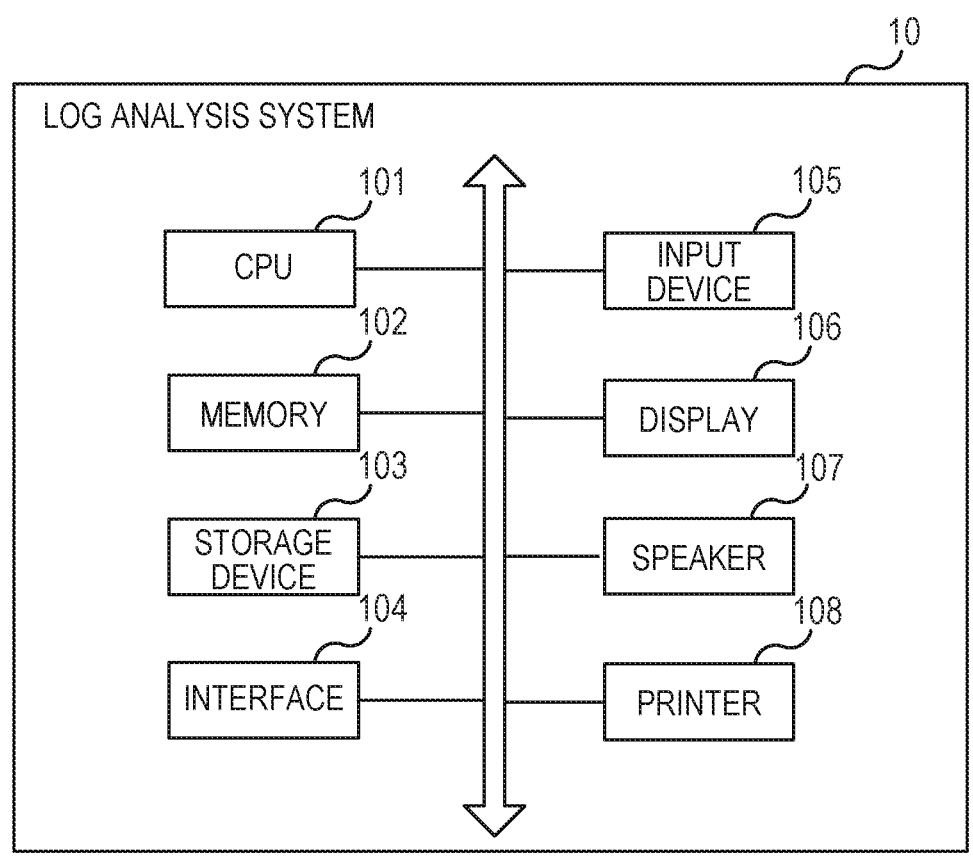
FIG. 2 is a block diagram illustrating a hardware configuration example of the log analysis system according to the first example embodiment.

FIG. 2 is a block diagram illustrating a hardware configuration example of the log analysis system 10 illustrated in FIG. 1. The log analysis system 10 has a central processing unit (CPU) 101, a memory 102, a storage device 103, an interface 104, an input device 105, a display 106, a speaker 107, and a printer 108.

The CPU 101 is a processor that performs overall control and calculation processes of the log analysis system 10 by loading a program stored in the storage device 103 on the memory 102 and executing the program. Further, the CPU 101 stores data of a process result in the storage device 103 and externally transmits the data of the process result via the interface 104.

The memory 102 includes a random access memory (RAM) or the like that temporarily stores data being processed by the CPU 101 or data read from the storage device 103.

The storage device 103 stores a program executed by the CPU 101, data of a process result caused by a program, or the like. The storage device 103 includes a read only memory (ROM) dedicated for reading, a writable hard disk drive or flash memory, or the like. Further, the storage device 103 may include a computer readable portable storage medium such as a CD-ROM.

The interface 104 is a communication unit that transmits and receives data and is configured to be able to perform a communication scheme of at least one of wired communication or wireless communication. The interface 104 includes a processor, an electric circuit, an antenna, a connection terminal, or the like required for the communication scheme. The interface 104 performs communication by using the communication scheme in accordance with a signal from the CPU 101.

The input device 105 includes a keyboard or the like that accepts entry from the user and transmits the input content to the CPU 101 as a signal. A touchscreen in which the input device 105 and the display 106 are integrated may be used.

The display 106 is a display device that displays predetermined information such as an inspection result of a log in accordance with a signal from the CPU 101. As the display 106, any display device such as a liquid crystal display may be used.

The speaker 107 is an audio output device that outputs a sound in accordance with a signal from the CPU 101. The printer 108 is a printer device that prints an inspection result of a log or the like in accordance with a signal from the CPU 101. Any printer device such as a thermal printer, an ink jet printer, a laser printer, or the like may be used as the printer 108.

Note that the log analysis system 10 is not limited to the configuration illustrated in FIG. 2 and may further have other devices. The log analysis system 10 may be formed of one or a plurality of devices or may be formed integrally with another device. Further, the log analysis system 10 may be connected to another device, and at least a part of a process performed by the log analysis system 10 in the present example embodiment may be performed by such another device.

Next, the operation of the log analysis system 10 according to the present example embodiment configured as described above will be described with reference to the drawings.

Figure 3:
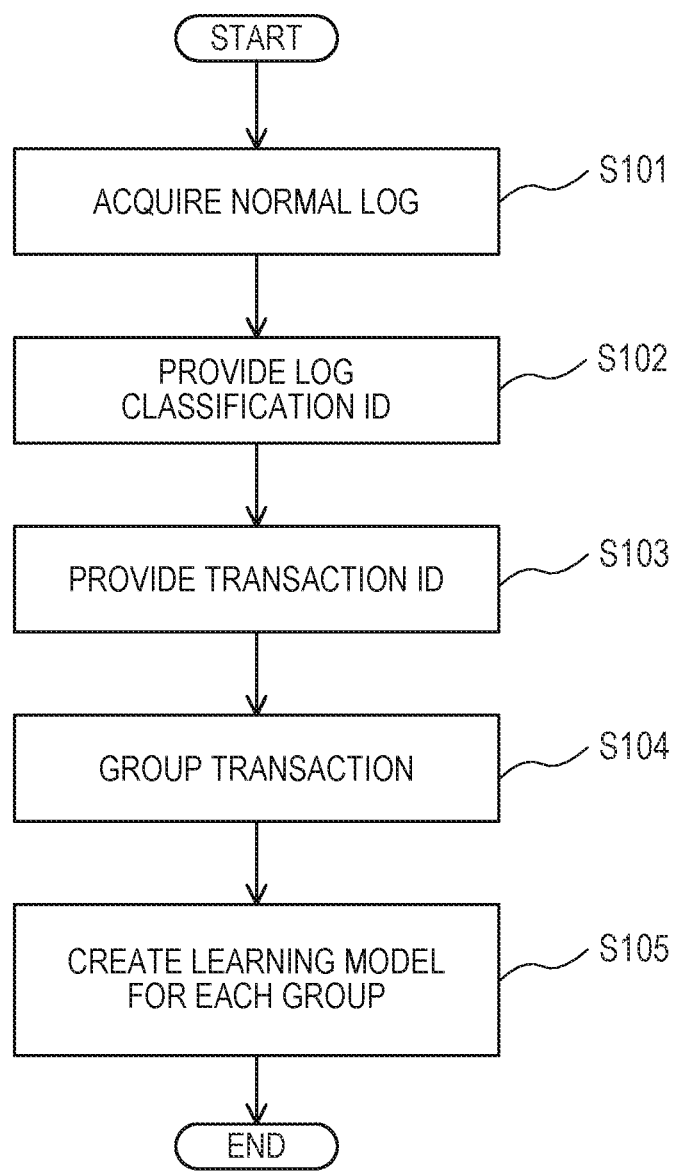
FIG. 3 is a flowchart illustrating a specific example of a learning process in the first example embodiment.

FIG. 3 is a flowchart illustrating a specific example of a learning process in the first example embodiment.

In step S101, the log classification unit 11 acquires a normal log output from the POS terminal 20 normally operating.

Figure 4:
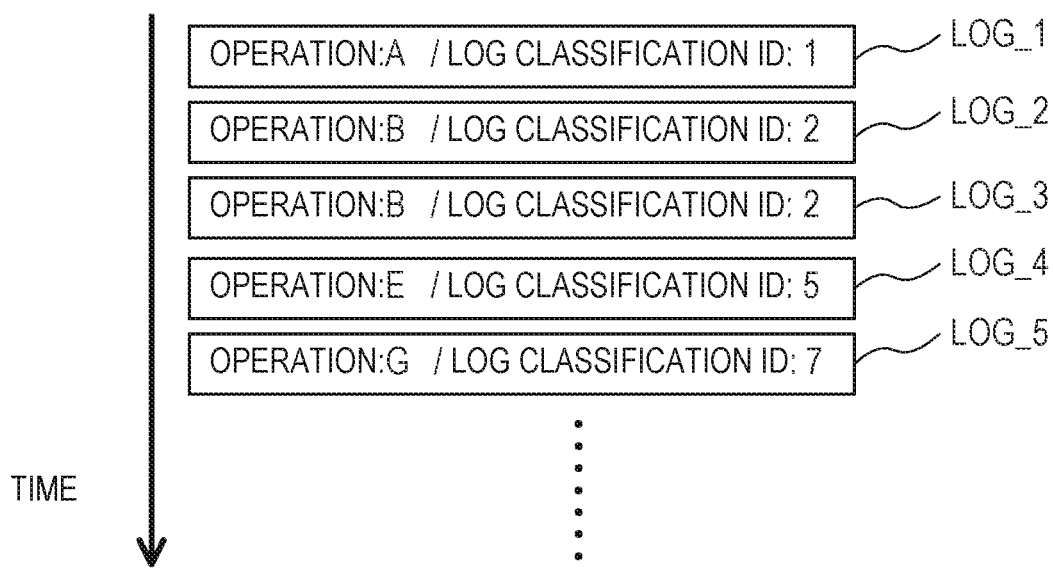
FIG. 4 is a diagram illustrating an example of classifying logs in the first example embodiment.

In step S102, the log classification unit 11 provides a log classification ID in accordance with the data type to the normal log. FIG. 4 is a diagram illustrating a classification example of logs in the first example embodiment. Here, five logs LOG_1 to LOG_5 are sequentially output. It is indicated that, since the type of data output from a device is different for operation contents (operation A, operation B, operation E, operation G), the log classification IDs of the logs LOG_1 to LOG_5 are provided with 1, 2, 2, 5, and 7, respectively.

In step S103, the transaction identifying unit 12 divides a data group of normal logs on a transaction basis and provides a transaction ID to each of the transactions. Note that, when identification information on a transaction is included in a normal log in advance, this identification information is used.

In step S104, the grouping unit 13 categorizes, into the same group, transactions for each combination of log classification IDs provided to respective normal logs at the start and the end of each transaction.

In step S105, the learning unit 14 counts, on a transaction basis, the number of occurrences of a log classification ID provided to normal logs of transactions categorized into the same group. The learning unit 14 then creates a learning model based on the minimum number and the maximum number of the number of occurrences of the log classification ID in a group.

Figure 5:
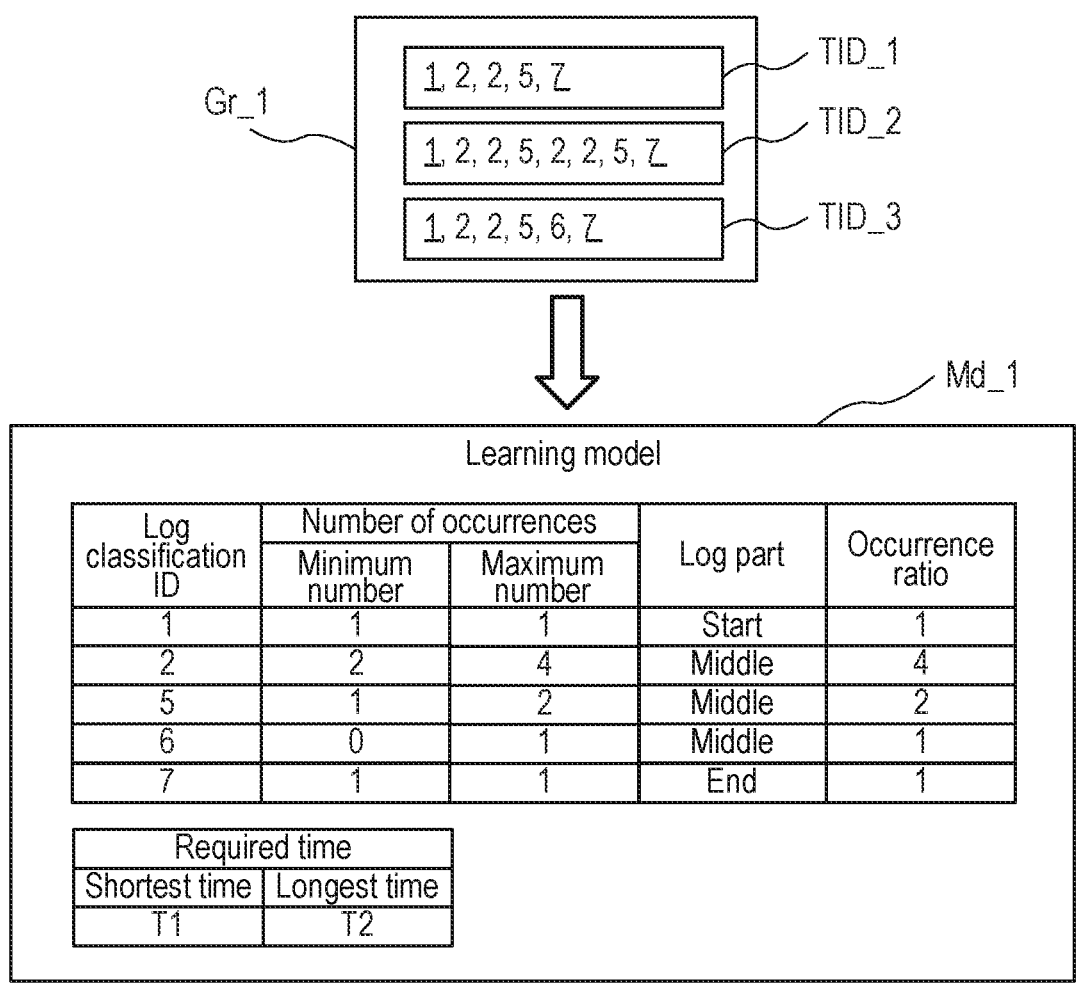
FIG. 5 is a diagram illustrating an example of creating a learning model in the first example embodiment.

FIG. 5 is a diagram illustrating an example of creating a learning model in the first example embodiment. In a data group of normal logs, there are three transactions TID_1 to TID_3 whose log classification ID at the start is "1" and log classification ID at the end is "7". Thus, the transactions TID_1 to TID_3 are categorized into the same group Gr_1. The logs of the transaction TID_1 appear in the sequence of log classification IDs "1, 2, 2, 5, 7". Further, the logs of the transaction TID_2 appear in the sequence of log classification IDs "1, 2, 2, 5, 2, 2, 5, 7". Further, the logs of the transaction TID_3 appear in a sequence of log classification IDs "1, 2, 2, 5, 6, 7".

The learning unit 14 counts the number of occurrences in the three transaction for each log classification ID and creates a learning model Md_1 in a table form including the maximum number (hereafter, referred to as "maximum number of occurrences") and the minimum number (hereafter, referred to as "minimum number of occurrences").

In detail, the log whose log classification ID is "2" appears twice each in the transaction TID_1 and the transaction TID_3 and appears for four times in the transaction TID_2. Therefore, for a log whose log classification ID is "2", modelling is performed as the minimum number of occurrences being "2" and the maximum number of occurrences being "4". Further, the log whose log classification ID is "6" appears once in the transaction TID_3 and does not appear in the transaction TID_1 or the transaction TID_2. Therefore, for a log whose log classification ID is "6", modelling is performed as the minimum number of occurrences being "0" and the maximum number of occurrences being "1". Furthermore, information on the shortest time and the longest time of the required time from the start to the end of a transaction among the transactions TID_1 to TID_3 is also included in definition information on the learning model Md_1.

Figure 6:
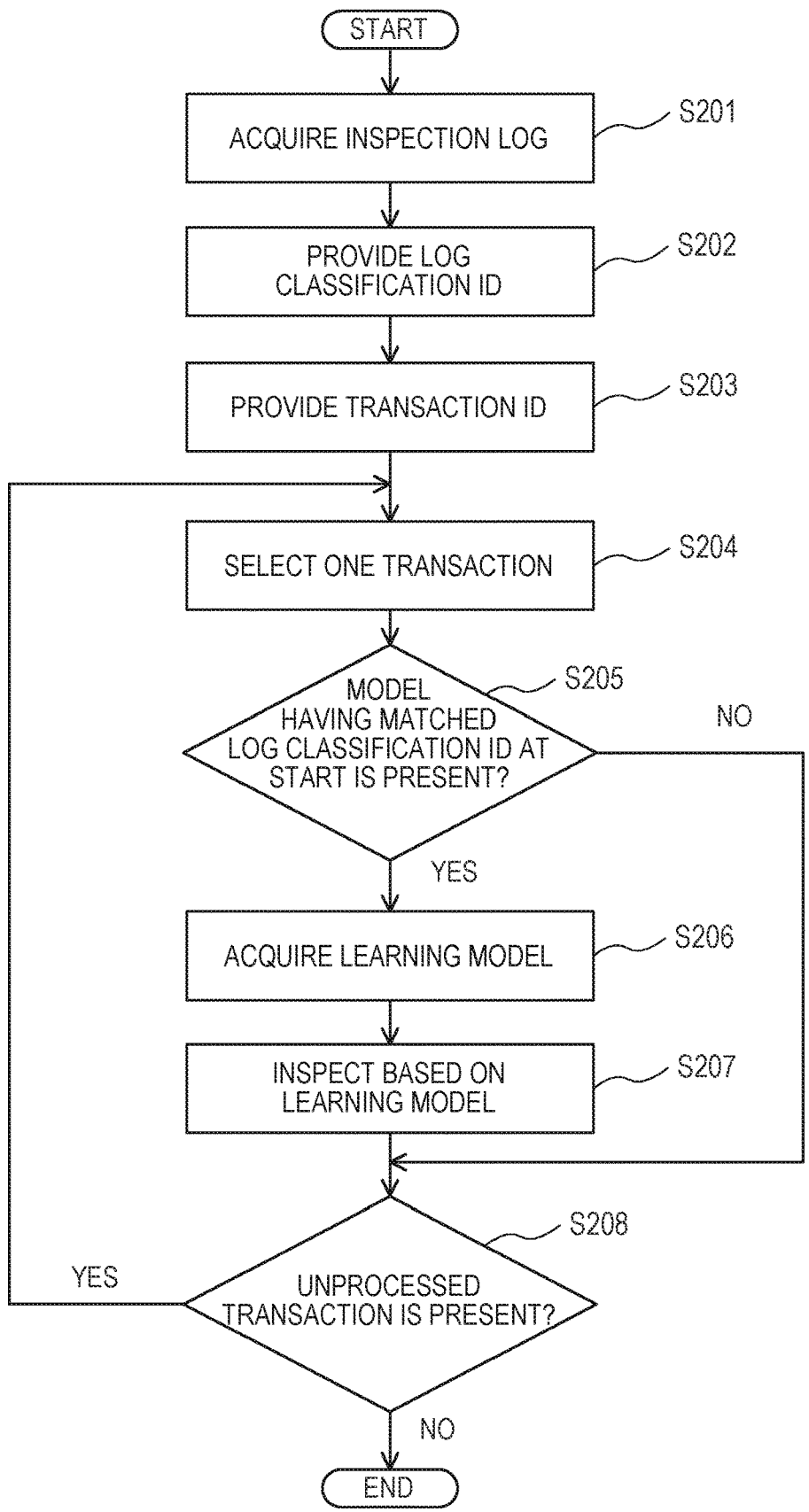
FIG. 6 is a flowchart illustrating a specific example of an inspection process in the first example embodiment.

FIG. 6 is a flowchart illustrating a specific example of an inspection process in the first example embodiment.

In step S201, the log classification unit 11 acquires a data group of inspection logs output by the POS terminal 20 at inspection.

In step S202, the log classification unit 11 provides a log classification ID in accordance with the data type to each inspection log.

In step S203, the transaction identifying unit 12 identifies a transaction from a data group of inspection logs, divides the data group on a transaction basis, and provides a transaction ID to each transaction. Note that, when identification information on a transaction is included in an inspection log in advance, the transaction identifying unit 12 can use this identification information.

In step S204, the learning unit 14 selects one transaction from a plurality of transactions included in the data group of inspection logs.

In step S205, the learning unit 14 references a learning model stored in the storage unit 15 based on the log classification ID provided to an inspection log related to the start of the selected transaction. Thereby, the learning unit 14 determines whether or not there is a learning model having a matched log classification ID at the start of the transaction. In this step, if it is determined that there is a learning model having a matched log classification ID at the start (step S205: YES), the process proceeds to step S206. On the other hand, if it is determined that there is no learning model having a matched log classification ID at the start (step S205: NO), the process proceeds to step S208.

In step S206, the learning unit 14 acquires, from the storage unit 15, a learning model having the log classification ID at the start that matches the selected transaction.

In step S207, the learning unit 14 inspects the transaction selected in step S204 based on the learning model and a predetermined anomaly detection condition. The specific example of this process will be described later.

In step S208, the learning unit 14 determines whether or not there is an unprocessed transaction. In this step, if it is determined that there is an unprocessed transaction (step S208: YES), the process returns to step S204. On the other hand, if it is determined that there is no unprocessed transaction (step S208: NO), the inspection process ends.

Figure 7:
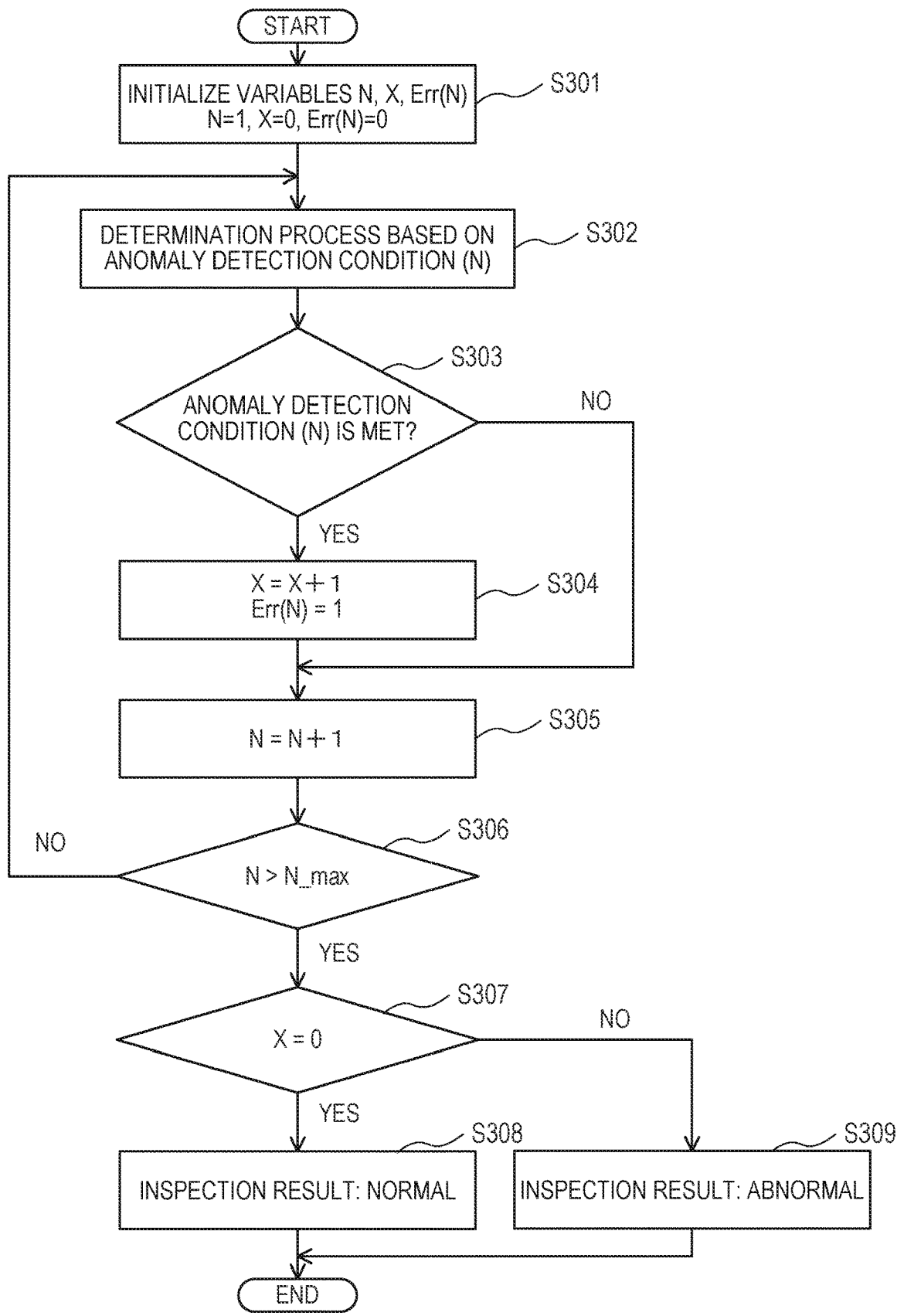
FIG. 7 is a flowchart illustrating a detailed example of a process of the inspection process illustrated in FIG. 6.

FIG. 7 is a flowchart illustrating a detailed process example of an inspection process in the first example embodiment and corresponds to step S207 of FIG. 6.

In step S301, the learning unit 14 initializes the value of a variable N to 1, which corresponds to No. of an anomaly detection condition, and the value of a variable X to 0, which corresponds to the number of times of anomaly detection, respectively. Furthermore, the learning unit 14 initializes the value of a variable Err(N) to 0, which corresponds to a process result for the anomaly detection condition (N).

In step S302, the learning unit 14 calls and executes a predetermined determination program corresponding to the anomaly detection condition (N).

In step S303, the learning unit 14 determines whether or not a transaction of an inspection target meets the anomaly detection condition (N). In this step, if it is determined that the anomaly detection condition (N) is met (step S303: YES), the process proceeds to step S304. On the other hand, in this step, if it is determined that the anomaly detection condition (N) is not met (step S303: NO), the process proceeds to step S305. Note that the specific example of an anomaly detection condition will be described later.

In step S304, the learning unit 14 increments the variable X by 1 and stores 1 as a value indicating anomaly detection to the variable Err(N).

In step S305, the learning unit 14 increments the variable N by 1 in order to proceed to a determination process of the next anomaly detection condition.

In step S306, the learning unit 14 determines whether or not the value of the variable N exceeds a constant N_max corresponding to the final No. of an anomaly detection condition. In this step, if it is determined that the value of the variable N exceeds N_max (step S306: YES), the process proceeds to step S307. On the other hand, if it is determined that the value of the variable N does not exceed N_max (step S306: NO), the process returns to step S302.

In step S307, the learning unit 14 determines whether or not the value of the variable N is 0. In this step, if it is determined that the value of the variable N is 0 (step S307: YES), the process proceeds to step S308. On the other hand, if it is determined that the value of the variable N is not 0 (step S307: NO), the process proceeds to step S309.

In step S308, the learning unit 14 outputs a message indicating that the inspection result is "Normal (there is no failure)" to the display 106 or the printer 108, for example.

In step S309, the learning unit 14 outputs a message indicating that the inspection result is "Abnormal (there is a failure)" to the display 106 or the printer 108, for example. Note that, by including the value of the variable Err(N) in the inspection result, the user may determine which condition of a plurality of anomaly detection conditions (N) is met.

FIG. 8 is a diagram illustrating a specific example of the anomaly detection conditions in the first example embodiment. In the present example embodiment, the actual determination process corresponding to the anomaly detection condition illustrated in FIG. 8 is performed by calling a program (sub-routine) corresponding to each anomaly detection condition from a main program corresponding to the inspection unit 16, for example. Note that the determination process corresponding to the anomaly detection condition may be directly described in the main program.

The determination process performed by the inspection unit 16 based on anomaly detection conditions (1) to (8) illustrated as an example in FIG. 8 will be described below in detail.

The anomaly detection condition (1) is that "the number of occurrences of an inspection log exceeds the maximum number of occurrences in a learning model". In this case, the inspection unit 16 counts the number of occurrences for each log classification ID in a transaction of an inspection target and, if the count value is larger than the maximum number of occurrences of the same log classification ID in the learning model, detects this as a failure. According to this anomaly detection condition (1), the inspection unit 16 can detect a failure when a key is input for multiple times, for example.

The anomaly detection condition (2) is that "the number of occurrences of an inspection log is less than the minimum number of occurrences in a learning model". In this case, the inspection unit 16 counts the number of occurrences for each log classification ID in a transaction of an inspection target and, if the count value is smaller than the minimum number of occurrences of the same log classification ID in the learning model, detects this as a failure. According to this anomaly detection condition (2), the inspection unit 16 can detect a failure when data is not input even when a key is pressed or a barcode is scanned, for example.

The anomaly detection condition (3) is that "the log classification ID is different between the end log of a transaction and the end log in a learning model". In this case, the inspection unit 16 compares a log classification ID provided to an inspection log at the end of a transaction of an inspection target with a log classification ID defined for the end of a transaction in the learning model and, if there is no matching between the log classification IDs, detects this as a failure. According to this anomaly detection condition (3), the inspection unit 16 can detect a failure when a series of processes of a device is not correctly terminated.

The anomaly detection condition (4) is that "the required time from the start to the end of a transaction of an inspection target is shorter than the shortest time defined in a learning model". In this case, if the required time from the start to the end of a transaction of an inspection target is shorter than the shortest time defined in a learning model, the inspection unit 16 detects this as a failure. According to this anomaly detection condition (4), the inspection unit 16 can detect a failure when, out of a series of processes, a process inside a device that does not appear in a log is not performed.

The anomaly detection condition (5) is that "the required time from the start to the end of a transaction of an inspection target is longer than the longest time defined in a learning model". In this case, if the required time from the start to the end of a transaction of an inspection target is longer than the longest time recorded in a learning model, the inspection unit 16 detects this as a failure. According to this anomaly detection condition (5), the inspection unit 16 can detect a failure when, out of a series of processes, a process inside a device that does not appear in a log causes a timeout error, for example.

The anomaly detection condition (6) is that "a log classification ID not included in a learning model appears in a transaction of an inspection target". In this case, if a log having a log classification ID that is not included in a learning model appears in a transaction of an inspection target, the inspection unit 16 detects this as a failure. According to this anomaly detection condition (6), the inspection unit 16 can detect a failure when an error log or an alert log that would not appear at a normal state is output from a device.

The anomaly detection condition (7) is that "none of log classification IDs included in a learning model appears in a transaction of an inspection target". In this case, if none of the log classification IDs defined in a learning model appears in a transaction of an inspection target, the inspection unit 16 detects this as a failure. According to this anomaly detection condition (7), the inspection unit 16 can detect a failure when data is not input when a key is pressed or a barcode is scanned in the same manner as the case of the anomaly detection condition (2) described above. However, a difference from the anomaly detection condition (2) described above is in that detection is directed to only a case where a log having a predetermined log classification ID does not at all appear during the transaction.

The anomaly detection condition (8) is that "the ratio of the number of occurrences of a log classification ID is different between a transaction of an inspection target and a learning model". In this case, the inspection unit 16 compares a ratio of the number of occurrences for each log classification ID in a transaction of an inspection target with a ratio of the number of occurrences for each log classification ID in a learning model. If there is no matching between the two ratios, this is then detected as a failure. According to this anomaly detection condition (8), the inspection unit 16 is effective for inspection when there is a repetition structure within a single transaction and the number of repetitions changes for each transaction, such as in a case of operations to scan barcodes of a plurality of items at the POS terminal 20, for example. Specifically, when a single transaction is referenced for each repetition part, if a normal repetition part and a repetition part including a failure are mixed, the inspection unit 16 can detect a failure only by the anomaly detection condition (8) of the eight conditions illustrated as an example.

Figure 9:
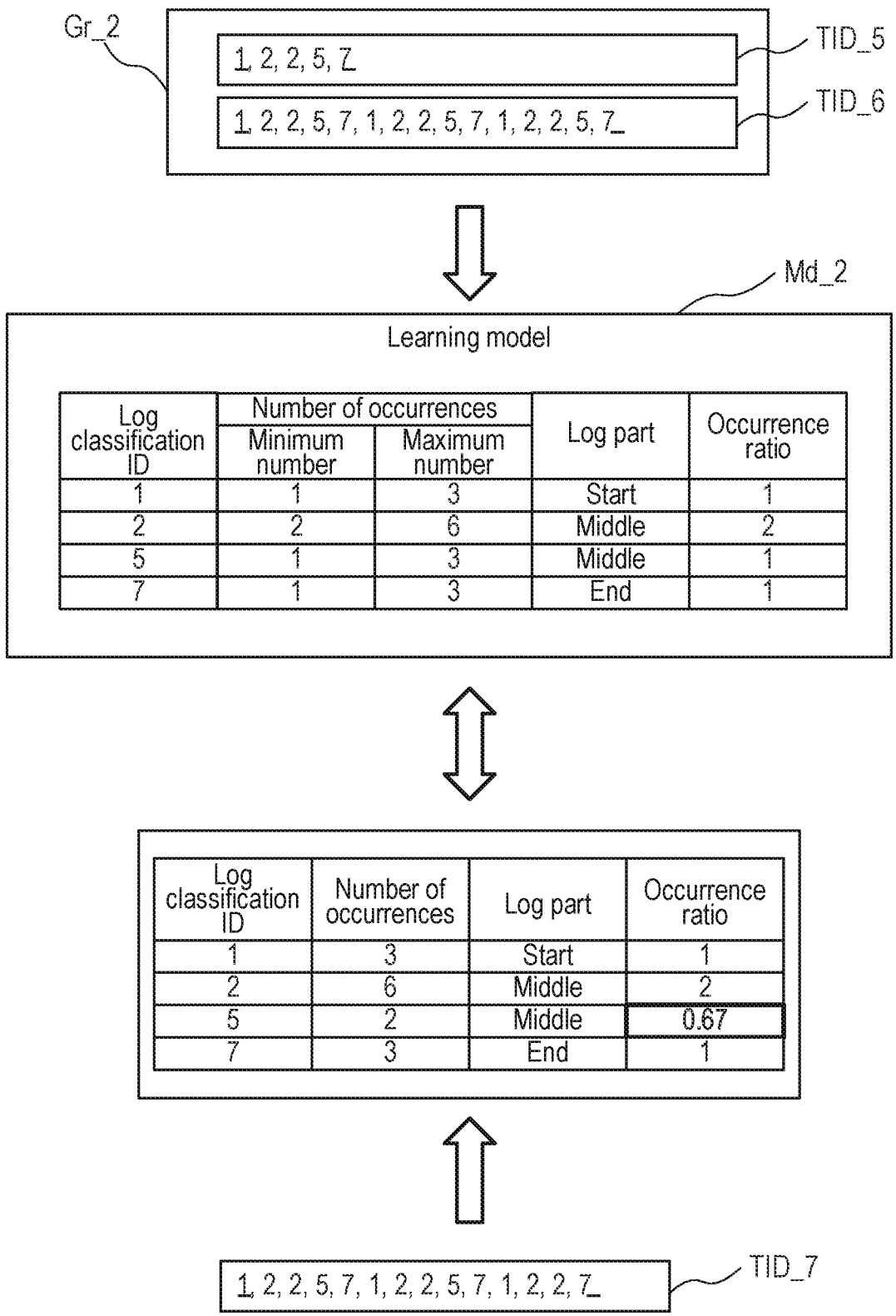
FIG. 9 is a diagram illustrating an example of inspection based on the learning model in the first example embodiment.

FIG. 9 is a diagram illustrating an inspection example based on the learning model at the inspection unit 16 illustrated in FIG. 1. This illustrates an example of learning the transaction TID_5 and the transaction TID_6 categorized into the same group Gr_2 and creating the learning model Md_2. The transaction TID_5 has data structure in which logs appear in the sequence of log classification IDs of "1, 2, 2, 5, 7". On the other hand, the transaction TID_6 has data structure in which logs appear so as to repeat the sequence of log classification IDs of "1, 2, 2, 5, 7" for three times.

In such a case, each log having a log classification ID of "1", "5", or "7" appears once in the transaction TID_5 and appears for three times in the transaction TID_6. Therefore, each log having a log classification ID of "1", "5", or "7" is modelled as the minimum number of occurrences being "1" and the maximum number of occurrences being "3".

Further, a log having a log classification ID of "2" appears twice in the transaction TID_5 and appears for six times in the transaction TID_6. Therefore, the log having a log classification ID of "2" is modelled as the minimum number of occurrences being "2" and the maximum number of occurrences being "6".

Here, a case where the transaction TID_7 is input as an inspection target is considered. The transaction TID_7 has the data structure in which the data structure with log classification IDs of "1, 2, 2, 5, 7" is repeated twice and "1, 2, 2, 7" then occurs without occurrence of the inspection log whose log classification ID is "5" because an anomaly occurs in the third operation.

In such a case, because the inspection log whose log classification ID is "5" does not appear in the third repetition part, detection of a failure by the anomaly detection condition (7) described above may be possible. However, since the inspection log whose log classification ID is "5" normally appears at and before the second repetition, the failure cannot be detected by the anomaly detection condition (7). Further, the number of occurrences of the inspection log whose log classification ID is "5" is between the maximum number of occurrences and the minimum number of occurrences at learning. Thus, the failure cannot be detected by the anomaly detection condition (2) either.

Accordingly, in the case of such a failure, the failure is detected by the anomaly detection condition (8) based on the ratio of occurrence times. This is because the ratio of the number of occurrences of the log classification ID does not change even when the repetition structure appears for any times within a transaction. When the ratio of the number of occurrences of a log classification ID at learning is not the same as that at inspection, the inspection unit 16 can detect this as a failure by taking advantage of the above feature.

In FIG. 9, the inspection unit 16 categorizes transactions having the same log classification ID at the start and the same log classification ID at the end into the same group and, when creating one leaning model, calculates an occurrence ratio by using the number of occurrences of a log classification ID ("1") at the start as a reference. The occurrence ratio of the log classification ID in the learning model Md_2 is "1, 2, 1, 1". On the other hand, the ratio in the inspection data is calculated as "1, 2, 0.67, 1" by using the number of occurrences "3" of the log classification ID "1" at the start as a reference.

Note that the occurrence ratio of a log classification ID may be calculated by referencing the minimum number of occurrences in a learning model and defining the number of occurrences of a log classification ID indicating the minimum value thereof as a reference "1". For example, in the learning model Md_2 illustrated in FIG. 9, since the minimum value of the minimum number of occurrences is "1", the ratio model will be "1, 2, 1, 1".

Similarly, when a ratio is calculated also for an inspection log by using the minimum value of the number of occurrences as a reference, since the numbers of occurrences are "3, 6, 2, 3", the ratio will be "1.5, 3, 1, 1.5". Therefore, since this is different from a ratio model at learning, this transaction can be detected as a failure.

As described above, according to the log analysis system 10 according to the present example embodiment, a learning model is created based on the number of occurrences instead of the occurrence sequence of logs within a transaction, and a transaction of an inspection target is inspected based on the learning model. Thus, even in a case of an electronic device such as the POS terminal 20 on which irregular operations are performed by a human, for example, a failure can be accurately detected from logs output by the electronic device.

Second Example Embodiment

Figure 10:
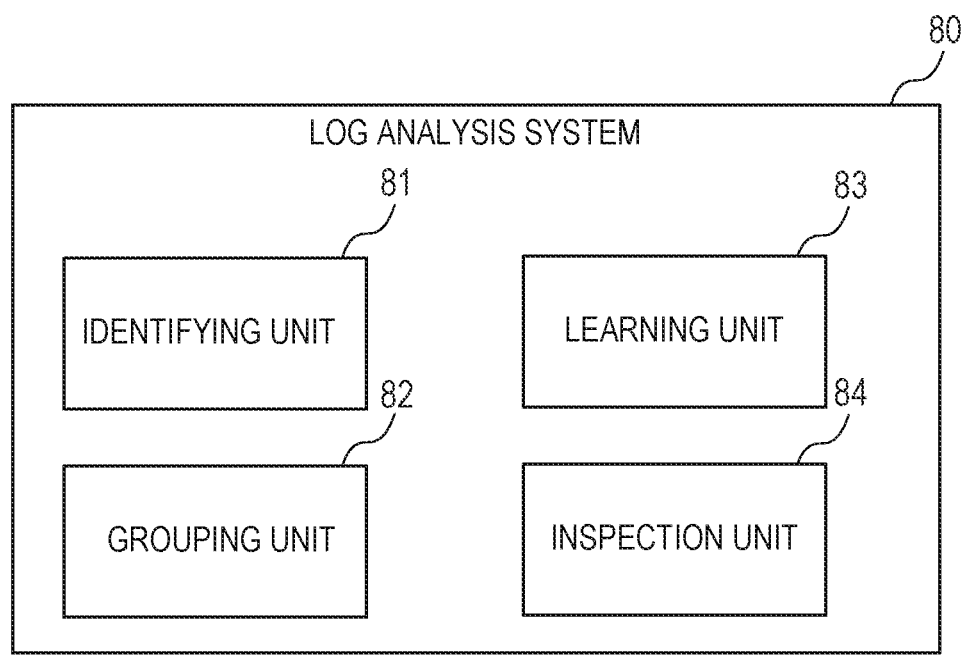
FIG. 10 is a block diagram illustrating an example of the overall configuration of a log analysis system according to a second example embodiment.

FIG. 10 is a block diagram illustrating the entire configuration example of a log analysis system 80 according to a second example embodiment. The log analysis system 80 has an identifying unit 81, a grouping unit 82, a learning unit 83, and an inspection unit 84. The identifying unit 81 identifies a transaction from logs output from a device. The grouping unit 82 categorizes transactions having both the same log related to the start and the same log related to the end into the same group. The learning unit 83 creates a learning model that defines the number of occurrences on a log type basis in the transactions of the same group. The inspection unit 84 inspects a transaction of an inspection target based on the learning model.

According to the log analysis system 80 according to the present example embodiment, a failure can be accurately detected from logs output by an electronic device.

Modified Example Embodiment

While the present invention has been described above with reference to the example embodiments, the present invention is not limited to these example embodiments described above. Various modifications that can be appreciated by those skilled in the art can be made to the configuration and details of the invention of the present application within the scope not departing from the spirit of the present invention. For example, it is to be appreciated that an example embodiment in which a part of the configuration of any of the example embodiments is added to another example embodiment or an example embodiment in which a part of the configuration of any of the example embodiments is replaced with a part of the configuration of another example embodiment is also an example embodiment to which the present invention may be applied.

For example, in the example embodiments described above, when a log classification ID related to a log at the start of a transaction is the same as a log classification ID related to a log at the start defined in a learning model, a transaction including an inspection log is inspected by using the learning model. However, a selection condition of the transaction may be that the log classification IDs related to logs at the start and the end of a transaction of an inspection target are the same as those in a learning model. In such a case, there is an advantage of the refined learning models to be used as a determination reference.

Further, while a process example of performing a determination process for all the anomaly detection conditions has been illustrated in the example embodiments described above, when any one of the anomaly detection conditions is met, the determination process for other conditions may not be performed. In such a case, there is an advantage of the reduced process time required for determination. Further, the scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disk-read only memory (CD-ROM), a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

A log analysis system comprising:

an identifying unit that identifies transactions from logs output from a device;

a grouping unit that categorizes the transactions having both the same log related to start and the same log related to end into the same group;

a learning unit that creates a learning model that defines the number of occurrences on a log type basis in the transactions of the same group; and an inspection unit that inspects a transaction of an inspection target based on the learning model.

(Supplementary Note 2)

The log analysis system according to supplementary note 1 further comprising a classification unit that provides log classification IDs in accordance with the log type for each of the logs, wherein the learning model defines the number of occurrences for each of the log classification IDs.

(Supplementary Note 3)

The log analysis system according to supplementary note 1 or 2, wherein the learning model defines a maximum number and a minimum number of the number of occurrences on the log type basis among the transactions of the same group.

(Supplementary Note 4)

The log analysis system according to any one of supplementary notes 1 to 3, wherein the learning model is in a table form.

(Supplementary Note 5)

The log analysis system according to any one of supplementary notes 1 to 4, wherein the learning model defines a maximum number of the number of occurrences on the log type basis among the transactions of the same group, and wherein the inspection unit detects an anomaly of the device when the number of occurrences in the transaction is greater than the maximum number.

(Supplementary Note 6)

The log analysis system according to any one of supplementary notes 1 to 5, wherein wherein the learning model defines a minimum number of the number of occurrences on the log type basis among the transactions of the same group, and wherein the inspection unit detects an anomaly of the device when the number of occurrences in the transaction is less than the minimum value.

(Supplementary Note 7)

The log analysis system according to any one of supplementary notes 1 to 6, wherein the inspection unit detects an anomaly of the device when log types related to start and end of the transaction are different at the end from log types related to the start and the end defined in the learning model.

(Supplementary Note 8)

The log analysis system according to any one of supplementary notes 1 to 7, wherein the learning model includes, in definition information, the shortest time of required time from start to end of the transaction among the transactions of the same group, and wherein the inspection unit detects an anomaly of the device when required time of the transaction of the inspection target is shorter than the shortest time.

(Supplementary Note 9)

The log analysis system according to any one of supplementary notes 1 to 8, wherein the learning model includes, in definition information, the longest time of required time from start to end of the transaction among the transactions of the same group, and wherein the inspection unit detects an anomaly of the device when required time of the transaction of the inspection target is longer than the longest time.

(Supplementary Note 10)

The log analysis system according to any one of supplementary notes 1 to 9, wherein the inspection unit detects an anomaly of the device when a log which is not included in the learning model appears in the transaction of the inspection target.

(Supplementary Note 11)

The log analysis system according to any one of supplementary notes 1 to 10, wherein the inspection unit detects an anomaly of the device when none of the logs except logs at the start and the end defined in the learning model appears in the transaction of the inspection target.

(Supplementary Note 12)

The log analysis system according to any one of supplementary notes 1 to 11, wherein the inspection unit detects an anomaly of the device when a ratio of the number of occurrences for each log type defined in the learning model and a ratio of the number of occurrences for each log type in the transaction of the inspection target are different from each other.

(Supplementary Note 13)

The log analysis system according to any one of supplementary notes 1 to 12, wherein the inspection unit determines the transaction as an inspection target when the log type related to the start is the same between the learning model and the transaction.

(Supplementary Note 14)

The log analysis system according to any one of supplementary notes 1 to 12, wherein when the log types related to the start and the end in the learning model are the same as the log types related to the start and the end in the transaction, the inspection unit determines the transaction as an inspection target.

(Supplementary Note 15)

The log analysis system according to any one of supplementary notes 1 to 13, wherein the inspection unit detects an anomaly of the device when any of the logs of a type included in the learning model does not appear in the transaction of the inspection target.

(Supplementary Note 16)

A log analysis method comprising: identifying transactions from logs output from a device;

categorizing the transactions having both the same log related to start and the same log related to end into the same group;

creating a learning model that defines the number of occurrences on a log type basis in the transactions of the same group; and inspecting a transaction of an inspection target based on the learning model.

(Supplementary Note 17)

A log analysis program that causes a computer to perform: identifying transactions from logs output from a device;

categorizing the transactions having both the same log related to start and the same log related to end into the same group;

creating a learning model that defines the number of occurrences on a log type basis in the transactions of the same group; and inspecting a transaction of an inspection target based on the learning model.

(Supplementary Note 18)

A storage medium storing a program that causes a computer to perform:

identifying transactions from logs output from a device;

categorizing the transactions having both the same log related to start and the same log related to end into the same group;

creating a learning model that defines the number of occurrences on a log type basis in the transactions of the same group; and inspecting a transaction of an inspection target based on the learning model.

REFERENCE SIGNS LIST 10 log analysis system
11 log classification unit
12 transaction identifying unit
13 grouping unit
14 learning unit
15 storage unit
16 inspection unit
20 POS terminal (electronic device)
101 CPU
102 memory
103 storage device
104 interface
105 input device
106 display
107 speaker
108 printer
80 log analysis system
81 identifying unit
82 grouping unit
83 learning unit
84 inspection unit
LOG_1 to LOG_5 log
TID_1 to TID_7 transaction
Gr_1, Gr_2 group
Md_1, Md_2 learning model

The invention claimed is:

1. A log analysis system comprising:
one or more memories storing instructions; and
one or more processors configured to execute the instructions to implement:
an identifying unit that identifies a transaction that is a set of logs corresponding to a series of operations of a user on a device, from a group of logs output from the device;
a grouping unit that categorizes the transactions having both the same log related to start and the same log related to end into the same group;
a learning unit that creates a learning model that defines the number of occurrences on a log type basis in the transactions of the same group; and
an inspection unit that inspects a transaction of an inspection target based on the learning model.

2. The log analysis system according to claim 1, wherein the one or more processors are further configured to execute the instructions to implement a classification unit that provides log classification IDs in accordance with the log type for each of the logs,
wherein the learning model defines the number of occurrences for each of the log classification IDs.

3. The log analysis system according to claim 1, wherein the learning model defines a maximum number and a minimum number of the number of occurrences on the log type basis among the transactions of the same group.

4. The log analysis system according to claim 1, wherein the learning model is in a table form.

5. The log analysis system according to claim 1,
wherein the learning model defines a maximum number of the number of occurrences on the log type basis among the transactions of the same group, and
wherein the inspection unit detects an anomaly of the device when the number of occurrences in the transaction is greater than the maximum number.

6. The log analysis system according to claim 1,
wherein the learning model defines a minimum number of the number of occurrences on the log type basis among the transactions of the same group, and
wherein the inspection unit detects an anomaly of the device when the number of occurrences in the transaction is less than the minimum value.

7. The log analysis system according to claim 1, wherein the inspection unit detects an anomaly of the device when log types related to start and end of the transaction are different at the end from log types related to the start and the end defined in the learning model.

8. The log analysis system according to claim 1,
wherein the learning model includes, in definition information, the shortest time of required time from start to end of the transaction among the transactions of the same group, and
wherein the inspection unit detects an anomaly of the device when required time of the transaction of the inspection target is shorter than the shortest time.

9. The log analysis system according to claim 1,
wherein the learning model includes, in definition information, the longest time of required time from start to end of the transaction among the transactions of the same group, and wherein the inspection unit detects an anomaly of the device when required time of the transaction of the inspection target is longer than the longest time.

10. The log analysis system according to claim 1, wherein the inspection unit detects an anomaly of the device when a log which is not included in the learning model appears in the transaction of the inspection target.

11. The log analysis system according to claim 1, wherein the inspection unit detects an anomaly of the device when none of the logs except logs at the start and the end defined in the learning model appears in the transaction of the inspection target.

12. The log analysis system according to claim 1, wherein the inspection unit detects an anomaly of the device when a ratio of the number of occurrences for each log type defined in the learning model and a ratio of the number of occurrences for each log type in the transaction of the inspection target are different from each other.

13. The log analysis system according to claim 1, wherein the inspection unit determines the transaction as an inspection target when the log type related to the start is the same between the learning model and the transaction.

14. A log analysis method comprising:
    identifying a transaction that is a set of logs corresponding to a series of operations of a user on a device, from a group of logs output from the device;
    categorizing the transactions having both the same log related to start and the same log related to end into the same group;
    creating a learning model that defines the number of occurrences on a log type basis in the transactions of the same group; and
    inspecting a transaction of an inspection target based on the learning model.

15. A non-transitory storage medium storing a program that, when executed by a computer, causes the computer to perform:
    identifying a transaction that is a set of logs corresponding to a series of operations of a user on a device, from a group of logs output from the device;
    categorizing the transactions having both the same log related to start and the same log related to end into the same group;
    creating a learning model that defines the number of occurrences on a log type basis in the transactions of the same group; and
    inspecting a transaction of an inspection target based on the learning model.

* * * * *